United States Patent Office 3,803,144
Patented Apr. 9, 1974

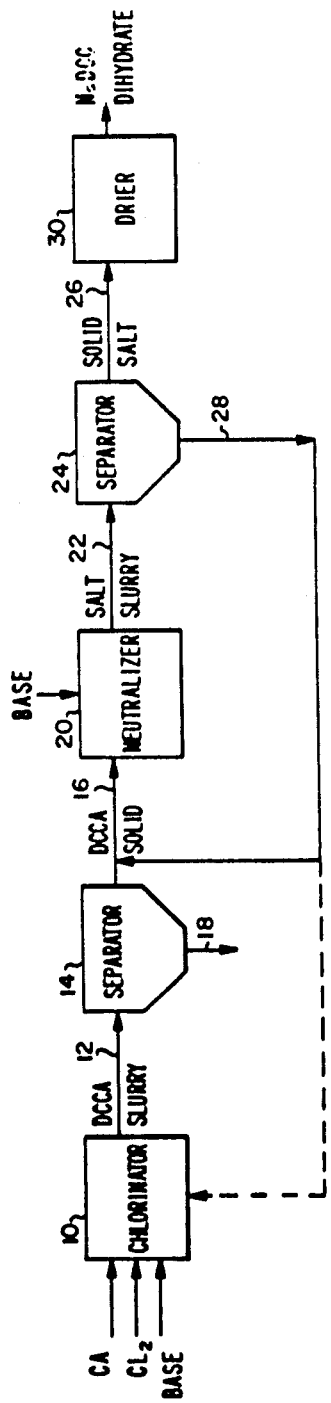

3,803,144
CONTINUOUS PRODUCTION OF SODIUM
DICHLOROISOCYANURATE DIHYDRATE
Sidney Berkowitz, 310 S. 4th Ave.,
Highland Park, N.J. 08904
Continuation-in-part of abandoned application Ser. No.
252,993, May 15, 1972. This application June 29, 1972,
Ser. No. 267,410
Int. Cl. C07d 55/40
U.S. Cl. 260—248 C      6 Claims

ABSTRACT OF THE DISCLOSURE

This invention provides a continuous process for producing sodium dichloroisocyanurate dihydrate without significant coproduction of sodium chloride in the same aqueous medium. A multistage process is provided employing cyanuric acid, sodium hydroxide, and chlorine or their equivalents as reactants and uses a critical drying step to produce sodium dichloroisocyanurate dihydrate.

---

This application is a continuation-in-part of Ser. No. 252,993, filed May 15, 1972, now abandoned.

This invention concerns sodium dichloroisoycanurate dihydrate which is a bleaching compound that has been produced by a process which results in sodium chloride being simultaneously produced as a coproduct.

The process disclosed in U.S. Pat. 3,035,056 produces sodium dichloroisocyanurate dihydrate by the chlorination of trisodiumisocyanurate with chlorine. The production of sodium dichloroisocyanurate dihydrate from trisodiumisocyanurate and chlorine proceeds according to the reaction:

$$C_3N_3O_3Na_3 + 2Cl_2 \rightarrow C_3H_2O_3NaCl_2 + 2NaCl$$

This reaction results in the production of both sodium dichloroisocyanurate and sodium chloride. The presence of sodium chloride in a sodium dichloroisocyanurate is undesirable in that it interferes with stability of the dichloroisocyanurate dihydrate. In order to continuously obtain a product that is substantially free of sodium chloride substantial quantities of water must be used in the reaction mixture. However, if the aqueous medium is recycled after separation of the sodium dichloroisocyanurate dihydrate, then sodium chloride will build-up in the aqueous medium regardless of the amount of water initially present because sodium chloride is continuously produced at a ratio of two moles of sodium chloride per mole sodium dichloroisocyanurate dihydrate. Therefore large quantities of water are required and the aqueous medium cannot be readily recycled.

Another method for producing sodium dichloroisocyanurate dihydrate disclosed in British Pat. 923,147, which corresponds to U.S. Pat. 3,035,056, comprises chlorinating one mole of trisodium cyanurate with two moles of trichloroisocyanuric acid. While such a reaction does not coproduce significant amounts of sodium chloride, it requires a separate source of trichloroisocyanuric acid in order to obtain the required reactant for the process.

Anhydrous sodium dichloroisocyanurate is produced according to the process described in U.S. Pat. 3,270,017 or similar processes.

Cynauric acid is commonly represented as existing in two tautomeric forms as follows:

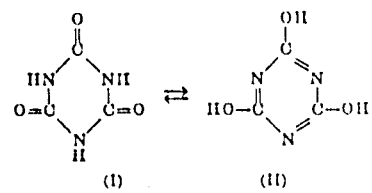

The terms dichloroisocyanuric acid and dichloroisocyanurate refer to the acid and salt respectively in either tautomeric form.

This invention provides a continuous process for producing free-flowing, particulate sodium dichloroisocyanurate dihydrate without the coproduction of sodium chloride in the same aqueous medium comprising reacting cyanuric acid, sodium hydroxide (and/or sodium hypochlorite), and chlorine in a first aqueous medium to produce a dichloroisocyanuric acid slurry, separating the solid dichloroisocyanuric acid from the slurry, neutralizing the solid dichloroisocyanuric acid with sodium hydroxide in a second aqueous medium to form sodium dichloroisocyanurate dihydrate particles, separating the sodium dichloroisocyanurate dihydrate particles from the second aqueous medium, drying the wet sodium dichloroisocyanurate dihydrate particles at a temperature from 15° C. to 50° C. to produce essentially dry sodium dichloroisocyanurate dihydrate and recycling the second aqueous medium preferably to the neutralizing step.

The figure is a schematic representation of the invention. It depicts the process for continuously producing sodium dichloroisocyanurate dihydrate from chlorine, cyanuric acid and sodium hydroxide.

The process provided by this invention can be described in greater detail with reference to the figure. Cyanuric acid, sodium hydroxide, and chlorine are reacted in chlorinator 10 to produce an aqueous slurry 12 containing solid dichloroisocyanuric acid (DCCA). The aqueous slurry is separated in separator 14 to solid dichloroisocyanuric acid 16 and brine effluent (first aqueous medium) 18 which is usually discarded. The solid dichloroisocyanuric acid 16 is neutralized in neutralizer 20 with sodium hydroxide. The neutralizer effluent is a sodium dichloroisocyanurate dihydrate slurry 22 which is separated in separator 24 into wet sodium dichloroisocyanurate dihydrate particle 26 and a second aqueous medium 28 containing dissolved sodium dichloroisocyanurate. The solid dichloroisocyanurate dihydrate is then dried in dryer 30 to remove uncombined water at a temperature from 20° C. to 50° C. to produce dry sodium dichloroisocyanurate dihydrate essentially free from sodium chloride contamination. The second aqueous medium 28 is recycled preferably to neutralizer 20. Any liquid build-up due to recycling can be corrected by a purge stream or by evaporation. Furthermore, liquid build-up problems can be avoided by recycling the second aqueous medium back to chlorinator 10.

By such a process the undesirable sodium chloride coproduct in chlorinator 10, is separated in separator 14, and leaves the process in the brine effluent 18. In contrast, the prior art process of making a dihydrate from trisodium cyanurate and chlorine results in sodium chloride being coproduced in neutralizer 20 and creates problems both with regards to product purity and stability and also complicates the recycling of the second aqueous medium.

The reaction in chlorinator 10 is shown employing cyanuric acid, chlorine and sodium hydroxide as reactants. However, the sodium hypochlorite can be used to replace sodium hydroxide and some of the chlorine.

Preferably, dichloroisocyanuric acid is continuously produced at a temperature from 5° C. to 45° C. by reacting sodium hydroxide and cyanuric acid in a mole ratio of from 1.9:1 to 2.1:1 along with sufficient chlorine in an aqueous reaction medium to result in a product slurry having a pH of from 1.5 to 3.5.

More preferably the chlorination reaction is continuously performed in two reaction zones by feeding an aqueous slurry containing cyanuric acid and about two moles of caustic soda per mole of cyanuric acid, and a separate stream of chlorine continuously to a first aqueous reaction zone in which the pH is maintained between 5 and 9 and the temperature between 5° C. and 40° C. A portion of reaction mixture from the first reaction zone is continuously withdrawn and fed, with additional chlorine, to a second aqueous reaction zone in which the pH is maintained between 1.5 and 3.5 and the temperature between 5° C. and 20° C. Reaction product containing solid dichloroisocyanuric acid is continuously withdrawn from the second reaction zone. The reaction product is usually separated according to standard solid-liquid separation techniques into solid dichloroisocyanuric acid and liquid effluent (first aqueous medium). The solid dichloroisocyanuric acid is preferably washed with water.

The solid (preferably washed) dichloroisocyanuric acid is slurried with a second aqueous medium and neutralized with sodium hydroxide to produce an aqueous slurry containing sodium dichloroisocyanurate dihydrate. This neutralization is carried out at temperatures of from about 5° C. to about 65° C. at a pH of from about 6 to about 7. The reactants normally are in about stoichiometric proportions within this pH range and are in the form of an aqueous slurry containing up to about 50% solids. The aqueous slurry is then separated into its liquid and solid components which are referred to as second aqueous medium and solid dichloroisocyanurate dihydrate respectively.

The second aqueous medium is essentially saturated with dissolved dichloroisocyanurate and therefore an efficient continuous process requires the recovery of these dichloroisocyanurate values by recycling or reusing the second aqueous medium. The amount of dichloroisocyanurate in the second aqueous medium depends upon temperature and in commercial operation the temperature varies between 0° C. and 40° C. which results in dichloroisocyanurate concentrations of between about 10% and about 25% in the second aqueous medium.

The solid sodium dichloroisocyanurate dihydrate after being separated from the second aqueous medium is quite pure because there is essentially no sodium chloride in the second aqueous medium.

The sodium dichloroisocyanurate dihydrate, after being separated from the second aqueous medium, is dried to remove at least 95% of the uncombined water employing conventional drying apparatus but at a critical temperature of 50° C. or lower, preferably from 15° C. to 50° C. More preferably, 99% or more of the uncombined water is removed. The pressure during drying is not critical with about atmospheric pressure being preferred for convenience, however, subatmospheric pressure is acceptable.

The solid sodium dichloroisocyanurate dihydrate product can be dried to remove some of the combined water to result in a mixture of the dihydrate and monohydrate and/or anhydrous dichloroisocyanurate. Such a product mixture having an average $H_2O$ content of greater than 11% contains substantial amount of dihydrate. The production of such a product mixture containing greater than 11% $H_2O$ constitutes the production of sodium dichloroisocyanurate dihydrate as the term is used herein although sodium dichloroisocyanurate particles having less than two waters of hydration are mixed with the dihydrate.

All proportions used herein are based upon weight unless indicated otherwise.

EXAMPLE

This exemplifies the continuous production of sodium dichloroisocyanurate dihydrate beginning with two-stage, continuous chlorination of cyanuric acid to produce dichloroisocyanuric acid followed by neutralization of the acid with sodium hydroxide to produce sodium dichloroisocyanurate dihydrate and then drying the dichlorosiocyanurate dihydrate to remove uncombined water.

For chlorination two reactors were used. Each reactor contained a side arm for continous overflow of product slurry. Vent gas from the second stage reactor was passed to the first stage reactor. Vent gas from the first stage reactor was passed to a scrubber.

The run was started with a heel of water in the first stage reactor. The NaOH-cyanuric acid feed was prepared by mixing dry cyanuric acid with sufficient 6% NaOH solution to provide a NaOH/cyanuric acid mole ratio of 2.02. This slurry was fed at a constant rate of about 12 ml. per minute to the first stage reactor along with the separate addition of sufficient chlorine to maintain a pH of 7 in the first stage reactor. After the first stage reactor filled and started overflowing to the second stage reactor, chlorine was fed to the second stage reactor to maintain a pH of 2.5. The volumes of reaction mixture in the first and second reactors were about 500 and 1250 ml., so that the average retention times were about 42 and 104 minutes, respectively.

After about three hours, both reactors were operating at essentially steady-state conditions, which were a temperature of 15° C. and pH of 7.0 and 2.5, respectively. During the succeeding period of 3 hours and 20 minutes while these conditions were maintained, the amount of cyanuric acid fed to the first stage and the product overflow from the second reactor were measured. The product slurry was filtered at essentially the operating temperature of 15° C. and 292 grams of product on the dry basis were recovered. This product contained 71% available chlorine showing it was essentially pure ichloroisocyanuric acid. The filtrate (first aqueous medium) was discarded.

The continuous preparation of sodium dichloroisocyanurate dihydrate was carried out by neutralizing in a third reactor a 20% by weight dichloroisocyanuric acid aqueous slurry produced with the dichloroisocyanuric acid product obtained above.

The dichloroisocyanuric acid aqueous slurry was fed into the third reactor and simultaneously a 50% sodium hydroxide solution was fed into the third reactor at a rate sufficient to maintain the pH at 6.8. The temperature of the reaction mixture was controlled between 20 and 25° C. by cooling the reaction mixture in a water cooled heat exchanger. The resulting slurry containing solid sodium dichloroisocyanurate dihydrate salt was continually removed and centrifuged to separate the salt from the second aqueous medium. The second aqueous medium was returned to the third reactor as make-up reaction medium.

The wet salt product was gently dried in a warm air stream at about 40° C. to remove only the unbound water, leaving essentially just the two bound waters of hydration. The resultant free-flowing white crystalline dihydrate was assayed for available chlorine (found 55.2%, theoretical 55.4%). Furthermore, the dihydrate was not contaminated with sodium chloride.

What is claimed is:

1. A continuous process for producing sodium dichloroisocyanurate dihydrate without the coproduction of sodium chloride in the same aqueous medium comprising;
   chlorinating cyanuric acid with sufficient chlorine and an alkali selected from the group consisting of sodium hypochlorite and sodium hydroxide to produce solid dichloroisocyanuric acid in a first aqueous medium at a pH of from 1.5 to 3.5 and at a temperature of from 5° C. to 45° C., the mole ratio of said alkali to said cyanuric acid being from 1.90:1 to 2.1:1,
   separating the solid dichloroisocyanuric acid from the first aqueous medium,
   neutralizing the solid dichloroisocyanuric acid with sodium hydroxide in a second aqueous medium at a pH from 6 to 7 and a temperature of 5° C. to 65° C. to form sodium dichloroisocyanurate dihydrate particles,
   separating the sodium dichloroisocyanurate dihydrate particles from the second aqueous medium, recycling the second aqueous medium, and
   drying the sodium dichloroisocyanurate dihydrate particles at a temperature from 15° C. to 50° C. to remove at least 95% of the uncombined water and to produce a free-flowing, particulate, sodium dichloroisocyanurate dihydrate product essentially free of sodium chloride contamination.

2. The process of claim 1 in which the second aqueous medium is recycled to the neutralization step.

3. The process of claim 1 in which the second aqueous medium is recycled to the chlorination step.

4. The process of claim 1 in which the drying temperature is at about 40° C. and at least 99% of the uncombined water is removed.

5. The process of claim 1 in which during drying at least 99% of the uncombined water is removed and some of the combined water is removed to produce sodium dichloroisocyanurate dihydrate mixed with sodium dichloroisocyanurate particles having less than two waters of hydration such that the water content of the mixture is greater than 11%.

6. The method of claim 1 wherein the chlorination comprises feeding a stream of an aqueous slurry, containing cyanuric acid and two mols of sodium hydroxide per mol of cyanuric acid, and a second stream of chlorine continuously to an aqueous reaction zone in which the pH is maintained between 5 and 9 and the temperature between 5° C. and 40° C., continuously withdrawing a portion of the reaction mixture and feeding it, with additional chlorine, to a second aqueous reaction zone in which the pH is maintained between 1.5 and 3.5 and the temperature between about 5° C. and 20° C., continuously withdrawing reaction product from the second reaction zone and recovering the precipitated dichloroisocyanuric acid from the withdrawn reaction product.

References Cited

UNITED STATES PATENTS

| | | | |
|---|---|---|---|
| 3,668,204 | 6/1972 | Mesiah | 260—248 |
| 3,712,891 | 1/1973 | Berkowitz et al. | 260—248 |

JOHN M. FORD, Primary Examiner